United States Patent [19]

DeNicola, Jr. et al.

[11] Patent Number: 5,508,319

[45] Date of Patent: Apr. 16, 1996

[54] HIGH MELT STRENGTH, ETHYLENE POLYMER, PROCESS FOR MAKING IT, AND USE THEREOF

[75] Inventors: Anthony J. DeNicola, Jr.; John W. Mayfield; Thomas F. McLaughlin, all of New Castle County, Del.; James R. Beren, Chester County, Pa.

[73] Assignee: Montell North America Inc., Wilmington, Del.

[21] Appl. No.: 293,251

[22] Filed: Aug. 19, 1994

Related U.S. Application Data

[63] Continuation of Ser. No. 898,766, Jun. 8, 1992, abandoned, which is a continuation-in-part of Ser. No. 718,951, Jun. 21, 1991, abandoned.

[51] Int. Cl.$^6$ .............................. C08J 3/28; C08F 110/02
[52] U.S. Cl. ..................... 522/161; 526/352; 526/352.2
[58] Field of Search ........................ 522/161; 526/352, 526/352.2

[56] References Cited

U.S. PATENT DOCUMENTS

| | | | |
|---|---|---|---|
| 3,362,897 | 1/1968 | Lawton | 522/161 |
| 3,563,869 | 2/1971 | Rainer | 522/161 |
| 3,563,870 | 2/1971 | Tung | 522/161 |
| 4,525,257 | 6/1985 | Kurtz | 522/161 |
| 4,586,995 | 5/1986 | Randall | 522/161 |
| 4,598,128 | 7/1986 | Randall | 522/161 |
| 4,916,198 | 4/1990 | Scheve | 522/129 |
| 5,047,446 | 9/1991 | DeNicola | 522/157 |
| 5,047,485 | 9/1991 | DeNicola | 525/387 |

FOREIGN PATENT DOCUMENTS

| | | |
|---|---|---|
| 47171 | 3/1982 | European Pat. Off. . |
| 190889 | 8/1986 | European Pat. Off. . |
| 1272475 | 8/1961 | France . |
| 2019412 | 10/1979 | United Kingdom . |
| 84/01156 | 3/1984 | WIPO . |

*Primary Examiner*—Mark Chapman

[57] ABSTRACT

Disclosed is a normally solid, high molecular weight, gel-free, irradiated ethylene polymer having a density of from 0.89 to 0.97 g/cc characterized by high melt strength due to strain hardening which is believed to be caused by free-end long chain branches of the molecular chains forming the polymer.

Also disclosed is a process for making the polymer by high energy radiation of a normally solid, high molecular weight, ethylene polymer in a reduced active oxygen environment, maintaining the irradiated material in such environment for a specific period of time, and then deactivating free radicals in the material.

5 Claims, 3 Drawing Sheets

FIG. 1

HIGH MELT STRENGTH, ETHYLENE POLYMER, PROCESS FOR MAKING IT, AND USE THEREOF

This application is a continuation of application Ser. No. 07/898,766, filed Jun. 8, 1992, now abandoned which is a continuation in part of Ser. No. 07/718,951 filed Jun. 21, 1991, now abandoned.

FIELD OF INVENTION

This invention resides in the chemical arts. More particularly, it relates to the chemical art having to do with synthetic resins derived from alpha or 1-olefins. Specifically, it relates to synthetic resins formed by the polymerization of ethylene alone or with other olefins.

BACKGROUND OF THE INVENTION

The synthetic resin formed by the polymerization of ethylene as the sole monomer is called polyethylene. While "polyethylene" has been used from time to time in the art to include a copolymer of ethylene and a minor amount of another monomer, such as butene-1, the term is not so used herein.

The polyethylene, such as low density polyethylene (LDPE) and high density polyethylene (HDPE), and copolymers of ethylene with a $C_{3-10}$ alpha-olefin, (generally referred to as linear low density polyethylene (LLDPE)), of commerce are normally solid, somewhat flexible, thermoplastic polymers formed by the polymerization of the particular monomer(s) by various methods well known in the art. For example, such polymers can be prepared by free-radical polymerization at high pressures, or by low pressure processes, such as fluidized-bed, gas phase technology, with molybdenum-based catalysts, with chromium-based catalysts, and with Ziegler-Natta catalysts systems. The high pressure processes produce polymers with long chain branching and the low pressure processes produce essentially linear polymers with controlled levels of short chain branching. In Ziegler-Natta catalyst systems, the catalyst is formed by an inorganic compound of a metal of Groups I–III of the Periodic Table, (for example, an aluminum alkyl), and a compound of a transition metal of Groups IV–VIII of the Periodic Table, (for example, a titanium halide). A typical crystallinity is about 21 to about 75 wt. % by the method of Wunderlick & Guar, J. Phys. Chem. Ref. Data, Vol 10, No. 1 (1981). Also, the typical melt index of said ethylene homopolymers or copolymers is from 0.2 and 50 g/10 minutes (measured according to ASTM 1238, Condition E). Moreover, the melting point of the crystalline phase of normally solid polyethylene of commerce is about 135° C.

Although the linear polyethylenes of commerce have many desirable and beneficial properties, they are deficient in melt strength. When molten, they exhibit no strain hardening (an increase in resistance to stretching during elongation of the molten material). Thus, linear polyethylenes have a variety of melt processing shortcomings, including the onset of edge weave during high speed extrusion coating of paper or other substrates, sheet sag and local thinning in melt thermoforming, and flow instabilities in coextrusion of laminate structures. As a result, their use has been limited in such potential applications as, for example, extrusion coating, blow molding, profile extrusion, and thermoforming.

Some effort has been made in the art to overcome the melt strength deficiency of the polyethylene of commerce.

Irradiation of polyethylene is known in the art, however, such irradiation has been conducted primarily on articles fabricated from polyethylene, such as films, fibers and sheets, and at high dosage levels, i.e., greater than 2 Mrads, in order to crosslink the polyethylene. For example, U.S. Pat. No. 4,668,577 discloses crosslinking of filaments of polyethylene, and U.S. Pat. No. 4,705,714 and 4,891,173 disclose differentially crosslinking a sheet made from high density polyethylene. The polyethylene crosslinked by these methods is reported to have improved melt strength and decreased solubility and melt flow. However, the crosslinking produced an undesirable decrease in melt extensibility of the polyethylene, thereby limiting the draw lengths typically required for film or fiber applications.

Another attempt to improve the melt strength and melt extensibility of polyethylene by exposing the linear polyethylene to low levels, i.e., 0.05 to 0.3 Mrads, of high energy radiation is disclosed in U.S. Pat. No. 3,563,870.

European Patent Application 047171 discloses the irradiation of ethylene polymers by heat aging the ethylene polymer granules by pretreating them with an atmosphere of steam in order to reduce the oxygen content in the granules, irradiating the thus treated polymer at a dosage of less than 1.5 Mrads, and then steaming the irradiated polymer.

British Patent No. 2,019,412 is directed to the irradiation of linear low density polyethylene (LLDPE) film at between 2 and 80 Mrads to provide increased elongation at break values.

U.S. Pat. No. 4,586,995 and 4,598,128 are directed to a method for obtaining long chain "Y" branching in ethylene polymers by heating an ethylene polymer under non-gelling, non-oxidizing conditions to produce terminal vinyl unsaturation in an ethylene polymer having no unsaturated end groups or to increase the terminal vinyl unsaturation in polyethylene containing unsaturated end groups, irradiating the treated treat ethylene polymer at a dosage of from 0.1 to 4 Mrad and then cooling, gradually or rapidly, the resulting irradiated polymer.

U.S. Pat. No. 4,525,257 discloses irradiation of narrow molecular weight, linear, low density ethylene/$C_{3-18}$ alpha-olefins copolymers at a radiation dosage of between 0.05 to 2 Mrad, to produce copolymers that are crosslinked without gelation to an extent sufficient to provide an increase in extensional viscosity and substantially equivalent high shear viscosity when compared with corresponding non-crosslinked polyethylene. The irradiated copolymer is not de-activated to reduce or eliminate residual radical intermediates.

SUMMARY OF THE INVENTION

This invention in one aspect comprises a normally solid, high molecular weight, gel-free, irradiated polyethylene, having a density of 0.89 to 0.97 g/cc, the molecular chains of which have a substantial amount of free-end long branches, a branching index of which is less than 1, and that has significant strain hardening elongational viscosity.

More broadly this invention comprises a normally solid, gel-free, high molecular weight, irradiated ethylene polymer material, the branching index of which is less than 1, and that has significant strain hardening elongational viscosity.

The ethylene polymers of this invention have a reduced melt index (as evidenced by $I_2$ at 190° C.) which evidences an increase in molecular weight, increase in the melt index ratio ($I_{10}/I_2$) which indicates a broadened molecular weight distribution, improved melt tension and strain hardening elongational viscosity, and branching indexes of less than 1.

The ethylene polymers of this invention are produced by low level radiation under controlled conditions.

As used herein, "ethylene polymer material" means ethylene polymer material selected from the group consisting of (a) homopolymers of ethylene, (b) random copolymers of ethylene and an alpha-olefin selected from the group consisting of $C_{3-10}$ alpha-olefins having a polymerized alpha-olefin content of about 20 (preferably about 16) % by weight, and (c) random terpolymers of ethylene and said alpha-olefins, provided that the maximum polymerized alpha-olefin content is about 20 (preferably about 16) % by weight. The $C_{3-10}$ alpha-olefins include the linear and branched alpha-olefins such as, for example, propylene, 1-butene, isobutylene, 1-pentene, 3-methyl-1-butene, 1-hexene, 3,4-dimethyl-1-butene, 1-heptene, 3-methyl-1-hexene, 1-octene and the like.

When the ethylene polymer is an ethylene homopolymer, it typically has a density of 0.960 g/cm$^3$ or greater, and when the ethylene polymer is an ethylene copolymer with a $C_{3-10}$ alpha-olefin, it typically has a density of 0.91 g/cm$^3$ or greater but less than 0.94 g/cm$^3$. Suitable ethylene copolymers include ethylene/butene-1, ethylene/hexene-1, ethylene/octene-1 and ethylene/4-methyl-1-pentene. The ethylene copolymer can be a high density polymer or a short chain branched LLDPE, and the ethylene homopolymer can be a or a LDPE. Typically the LLDPE and LDPE have densities of 0.910 g/cm$^3$ or greater to less than 0.940 g/cm$^3$ and the HDPE and high density ethylene copolymer have densities of greater than 0.940 g/cm$^3$, usually 0.950 g/cm$^3$ or greater. In general, ethylene polymer materials having a density from 0.89 to 0.97 g/cc are suitable for use in the practice of this invention. Preferably the ethylene polymers are LLDPE and HDPE having a density from 0.89 to 0.97 g/cc.

As used in this application, "high molecular weight" means a weight average molecular weight of at least about 50,000.

The branching index quantifies the degree of long chain branching. In preferred embodiments the branching index is preferably less than about 0.9 and most preferably about 0.2–0.8. It is defined by the equation:

$$g' = \frac{[IV]_{Br}}{[IV]_{Lin}}\bigg|_{M_w}$$

in which g' is the branching index, $[IV]_{Br}$ is the intrinsic viscosity of the branched ethylene polymer material and $[IV]_{Lin}$ is the intrinsic viscosity of the corresponding, ethylene polymer material, namely, normally solid, ethylene polymer material of substantially the same weight average molecular weight and, in the case of copolymers and terpolymers, substantially the same relative molecular proportion or proportions of monomer units.

Intrinsic viscosity, also known as the limiting viscosity number, in its most general sense is a measure of the capacity of a polymer molecule to enhance the viscosity of a solution. This depends on both the size and the shape of the dissolved polymer particle. Hence, in comparing a nonlinear polymer with a linear polymer of substantially the same weight average molecular weight, it is an indication of configuration of the nonlinear polymer molecule. Indeed, the above ratio of intrinsic viscosities is a measure of the degree of branching of the nonlinear polymer. A method for determining intrinsic viscosity of ethylene polymer material is described in J. App. Poly. Sci., 21, pp 3331–3343 (1977).

Weight average molecular weight can be measured by various procedures. However, the procedure preferably used here is that of laser light scattering photometry, which is disclosed by McConnell in Am. Lab., May 1978, in the article entitled "Polymer Molecular Weights and Molecular Weight Distribution by Low-Angle Laser Light Scattering".

Elongational viscosity is the resistance of a fluid or semifluid substance to elongation. It is a melt property of a thermoplastic material, that can be determined by an instrument that measures the stress and strain of a specimen in the melt state when subjected to tensile strain at a constant rate. One such instrument is described in, and shown in FIG. 1 of, Munstedt, J. Rheology, 23, (4), 421–425, (1979). A commercial instrument of similar design is the Rheometrics RER-9000 extensional rheometer. Molten, high molecular weight, ethylene polymer material exhibits elongational viscosity which, as it is elongated or drawn at a constant rate from a relatively fixed point, tends to increase for a distance dependent on the rate of elongation, and then to decrease rapidly until it thins to nothing—so-called ductile or necking failure. On the other hand, the molten ethylene polymer material of this invention, that is of substantially the same weight average molecular weight and at substantially the same test temperature as the corresponding, molten, high molecular weight, ethylene polymer material, exhibits elongational viscosity which, as it is elongated or drawn from a relatively fixed point at substantially the same rate of elongation tends to increase over a longer distance, and it breaks or fails by fracture—so-called brittle or elastic failure. These characteristics are indicative of strain hardening. Indeed, the more long chain branching the ethylene polymer material of this invention has the greater the tendency of the elongational viscosity to increase as the elongated material approaches failure. This latter tendency is most evident when the branching index is less than about 0.8.

Also melt tension provides an indication of the melt strength of the material. Melt tension is determined with a Gottfert Rheotens melt tension apparatus from Gottfert Inc. by measuring the tension of a strand of molten ethylene polymer in centi-newtons as follows: the polymer to be examined is extruded at 180° C. through a capillary 20 mm long and 2 mm in diameter; the strand is then subjected to stretching using a drawing system with a constant acceleration of 0.3 cm/sec$^2$. The tension resulting from the above drawing is measured (in centi-newtons). The higher the melt tension means the greater the melt strength values which, in turn, are indicative of the particular material's strain hardening ability.

This invention in another aspect provides a practical process for converting normally solid, high molecular weight, ethylene polymer material into normally solid, gel-free, ethylene polymer material, the branching index of which is less than 1, and that has significant strain hardening elongational viscosity.

The process comprises:

(1) irradiating said ethylene polymer material (a) in an environment in which the active oxygen concentration is established and maintained at less than about 15% by volume of said environment and (b) with high energy ionizing radiation at a dose rate in the range from about 1 to about 1×10$^4$ megarads per minute for a period of time sufficient to provide an exposure of up to 2.0 Mrads of radiation, but insufficient to cause gelation of the material;

(2) maintaining the thus irradiated material in such an environment for a period of time sufficient for a significant amount of long chain branches to form; and (3) then treating the irradiated material while in such an environment to deactivate substantially all the free radicals present in the irradiated material.

The ethylene polymer material treated according to the process of this invention can be any normally solid, high molecular weight ethylene polymer material. In general, the intrinsic viscosity of the starting, ethylene polymer material, which is indicative of its molecular weight, should be in general about 1–25, and preferably 1–6, to result in an end product with an intrinsic viscosity of 0.8–25, and preferably 1–3. However, ethylene polymer material with intrinsic viscosities higher and lower than these general values are within the broader scope of this invention. Ethylene polymer material having a melt index of about 0.01 and higher can be used.

The ethylene polymer material treated according to the process of this invention under the broadest concepts of the process can be in any physical form, for example, finely divided particles, granules, pellets, film, sheet, and the like. However, in preferred embodiments of the process of this invention, the ethylene polymer material is in pellet or spherical particle form with satisfactory results being obtained. Spherical particulate forms with weight average diameter of greater than 0.4 mm are preferred.

The active oxygen content of the environment in which the three process steps are carried out is a critical factor. The expression "active oxygen" herein means oxygen in a form that will react with the irradiated material and more particularly the free radicals in the material. It includes molecular oxygen (which is the form of oxygen normally found in air). The active oxygen content requirement of the process of this invention can be achieved by use of vacuum or by replacing part or all of air in the environment by an inert gas such as, for example, nitrogen.

The ethylene polymer material immediately after it is made is normally substantially free of active oxygen. Therefore, it is within the concepts of this invention to follow the polymerization and polymer work-up steps (when the ethylene polymer material is not exposed to air) with the process of this invention. However, in most situations the ethylene polymer material will have an active oxygen content because of having been stored in air, or for some other reason. Consequently, in the preferred practice of the process of this invention the finely divided ethylene polymer material is first treated to reduce its active oxygen content. A preferred way of doing this is to introduce the material into a bed of the same blown with nitrogen, the active oxygen content of which is equal to or less than about 0.004% by volume. The residence time of the material in the bed generally should be at least about 5 minutes for effective removal of active oxygen from the interstices of the particles of the material, and preferably long enough for the material to be in equilibrium with the environment.

Between this preparation step and the irradiation step, the prepared, ethylene polymer material should be maintained in an environment in which the active oxygen concentration is less than about 15%, preferably less than 5% in a gas conveyance system, and more preferably 0.004%, by volume of the environment. In addition, temperature of the ethylene polymer material should be kept above the glass transition temperature of the amorphous fraction of the material up to, but not higher than, about 70° C., preferably about 60° C.

In the irradiation step the active oxygen concentration of the environment preferably is less than about 5% by volume, and more preferably less than about 1% by volume. The most preferred concentration of active oxygen is less than 0.004% by volume.

In the irradiation step, the ionizing radiation should have sufficient energy to penetrate to the extent desired the mass of ethylene polymer material being radiated. The energy must be sufficient to ionize the molecular structure and to excite atomic structure, but not sufficient to affect atomic nuclei. The ionizing radiation can be of any kind, but the most practical kinds comprise electrons and gamma rays. Preferred are electrons beamed from an electron generator having an accelerating potential of 500–4,000 kilovolts. In the case of ethylene polymer material satisfactory results are obtained at a low level dose of ionizing radiation of about 0.2 to 2.0 megarads, preferably 0.3 to less than 2.0 megarads and most preferably 0.5 to 1.5 megarads, delivered generally at a dose rate of about 1–10,000 megarads per minute, and preferably about 18–2,000 megarads per minute.

The term "rad" is usually defined as that quantity of ionizing radiation that results in the absorption of 100 ergs of energy per gram of irradiated material, regardless of the source of radiation. As far as the instant invention is concerned, the amount of energy absorbed by the ethylene polymer material when it is irradiated usually is not determined. However, in the usual practice of the process energy absorption from ionizing radiation is measured by the well known conventional dosimeter, a measuring device in which a strip of fabric containing a radiation sensitive dye is the energy absorption sensing means. Hence, as used in this specification the term "rad" means that quantity of ionizing radiation resulting in the absorption of the equivalent of 100 ergs of energy per gram of the fabric of a dosimeter placed at the surface of the ethylene polymer material being irradiated, whether in the form of a bed or layer of particles, or a film, or a sheet.

The second step of the process of this invention should be performed in a period of time generally in the range from about one minute to about one hour, and preferably about 2–30 minutes. A minimum time is needed for sufficient migration of ethylene polymer chain fragments to free radical sites and for combination thereat to reform complete chains, or to form long branches on chains. A radical migration time less than one minute, for example, about a half minute, is within the broader concepts of this invention, but is not preferred because the amount of resulting free-end long chain branching is quite low.

The final step of the process, the free radical deactivation or quenching step, can be performed by the application of heat, generally from at least 60° C. to about 280° C., or by the addition of an additive that functions as a free radical trap, such as, for example, methyl mercaptan.

In one embodiment of the process the application of heat comprises melt extruding the irradiated ethylene polymer material. As a result, quenching of the free radicals is substantially complete. In this embodiment, prior to the extrusion or melt compounding, the irradiated ethylene polymer material can be blended with other polymers, if desired, and additives such as, for example, stabilizers, pigments, fillers, and the like. Alternatively, such additives can be incorporated as a side stream addition to the extruder.

In another embodiment of the inventive process the application of heat is achieved by introducing the irradiated ethylene polymer material into a fluidized bed or a staged fluid bed system in which the fluidizing medium is, for example, nitrogen or other inert gas. The bed or beds is or are established and maintained in a temperature range of at least about 60° C. up to a temperature which does not exceed the melting point of the polymer, with the average residence time of the irradiated ethylene polymer material in the fluid bed or beds being from about 5 minutes to about 120 minutes, with about 20–30 minutes being optimum.

The product thus obtained is a normally solid, high molecular weight, gel-free, ethylene polymer material characterized by strain hardening. The material is also characterized by a melt index ratio greater than 10.

Although the process of the invention can be carried out on a batch basis, preferably it is performed on a continuous basis. In one continuous embodiment of the process the finely divided, ethylene polymer material either with or without the preparation step, depending on the active oxygen content of the material, is layered on a traveling belt in the required environment. The thickness of the layer depends on the desired extent of penetration of the ionizing radiation into the layer and the proportion of irradiated ethylene polymer material desired in the final end product. The speed of travel of the traveling belt is selected so that the layer of finely divided, ethylene polymer material passes through the beam or beams of ionizing radiation at a rate to receive the desired dose of ionizing radiation. After having received the desired dose of ionizing radiation, the irradiated layer can be left on the traveling belt in said environment for the period of time for free-radical migration and combination to occur, and then removed from the belt, and introduced into an extruder operated at a melt temperature of the irradiated material, or, in another specific embodiment introduced into a heated bed, or a staged system of heated beds, of particles of irradiated material fluidized with nitrogen or other inert gas. In either embodiment, the irradiated material after at least substantially all of the free radicals therein are deactivated is discharged into the atmosphere and quickly cooled to room temperature. In another embodiment, the irradiated, ethylene polymer material is discharged from the belt and conveyed in the required environment to a holding vessel, the interior of which has the required environment, and held in the vessel to complete the requisite free radical migration time. The irradiated material then is introduced into an extruder operated at a melt temperature of the irradiated material or is introduced into a heated, inert gas fluidized bed, or a staged system of fluidized beds, of irradiated particles of ethylene polymer material and, after quenching of the free radicals, the irradiated polyethylene is discharged into the atmosphere.

This invention in still another aspect comprises the extensional flow use of the strain hardening, ethylene polymer material of this invention. Extensional flow occurs when the ethylene polymer material in the molten condition is pulled in one or more directions at a rate faster than it would normally flow in those directions. It happens in extrusion coating operations in which a melted coating material is extruded on to a substrate, such as a moving web of paper or metal sheet, and the extruder or substrate is moving at a higher rate than the extrusion rate. It takes place in film production when the molten film is extruded and then stretched to the desired thinness. It is present in thermoforming operations in which a molten sheet is clamped over a plug mold, vacuum is applied and the sheet is pushed into the mold. It occurs in the manufacture of foamed articles in which molten ethylene polymer material is expanded with a foaming agent. The strain hardening ethylene polymer material of this invention is particularly useful as part of (for example from as little as 0.5% by weight to as much as 95% or more by weight) or, particularly as substantially all of the molten plastic material used in these and other melt processing methods (for example, profile extrusion, as in the melt spinning of fibers) for making useful articles.

This invention is further illustrated by the accompanying drawings which form a material part of these disclosures, and by the following examples.

DESCRIPTION OF PREFERRED
EMBODIMENTS

Figure 1:
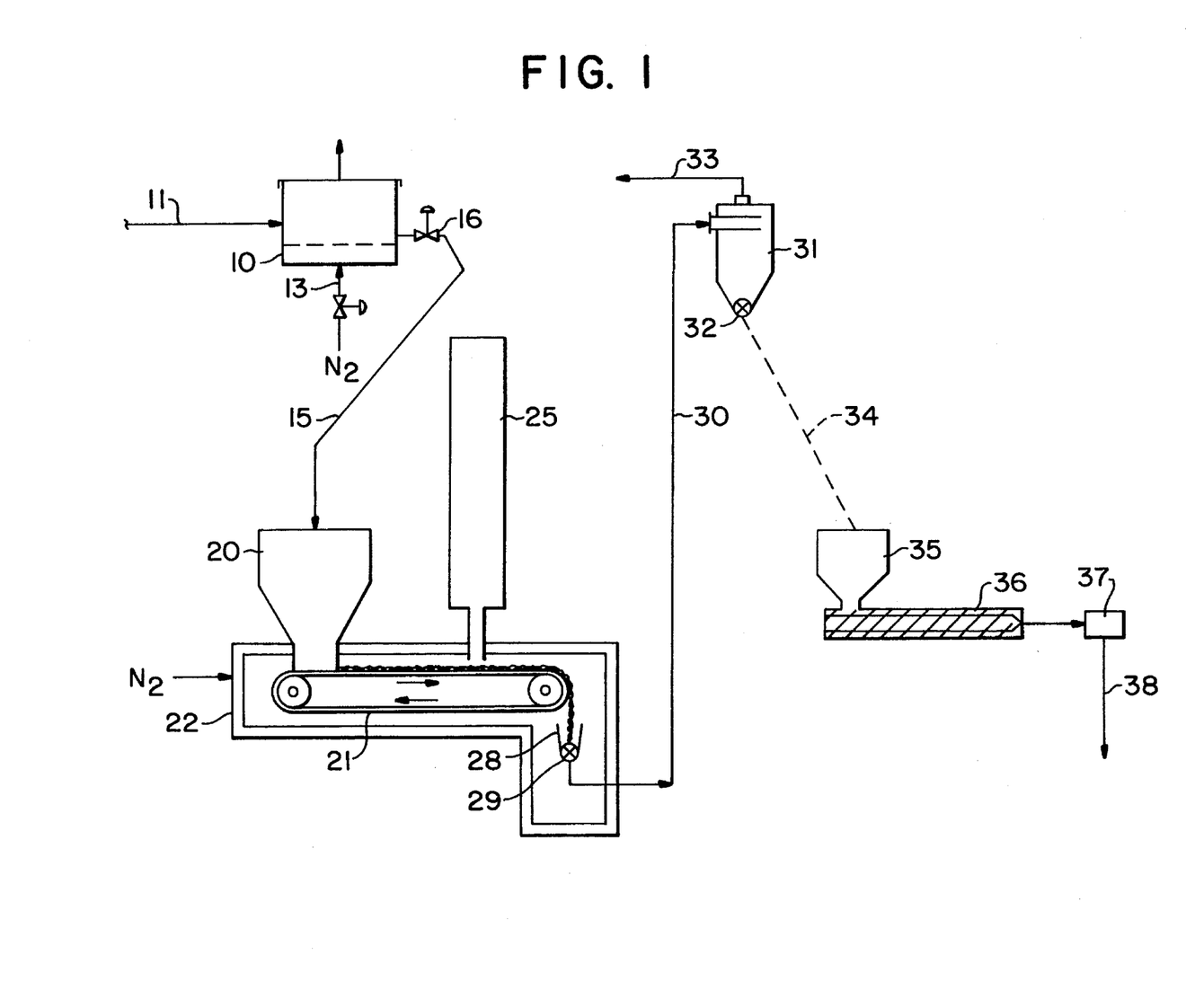
FIG. 1 is a schematic flow sheet of a preferred embodiment of a continuous process for converting, for example, normally solid, polyethylene into a normally solid, gel-free, polyethylene with strain hardening.

In greater detail, FIG. 1 depicts a fluid bed unit 10 of conventional construction and operation into which finely divided, high molecular weight, polyethylene is introduced by way of conduit 11, nitrogen gas is introduced by way of conduit 13, and from which substantially active oxygen free, high molecular weight, polyethylene is removed by way of a solids discharge conduit 15 which also has a solids flow rate controller 16. The solids discharge conduit 15 leads to a conveyer belt feed hopper 20.

The conveyer belt feed hopper 20 is a capped structure of conventional design. It is operated so that its interior contains a nitrogen atmosphere. It has a bottom solids discharge outlet through which the polyethylene particles move and form a layer on the top horizontal run of an endless conveyer belt 21.

The conveyer belt 21 is generally horizontally disposed, and continuously moves under normal operative conditions. It is contained in radiation chamber 22. This chamber completely encloses the conveyer belt, and is constructed and operated to establish and maintain a nitrogen atmosphere in its interior.

In combination with the radiation chamber 22 is an electron beam generator 25 of conventional design and operation. Under normal operative conditions it generates a beam of high energy electrons directed to the layer of polyethylene particles on the conveyer belt 21. Below the discharge end of the conveyer belt is a solids collector 28 arranged to receive the irradiated polyethylene particles falling off the conveyer belt 21 as it turns into its path of opposite travel. Irradiated polyethylene particles in the solids collector 28 are removed therefrom by a rotary valve or star wheel 29 and delivered thereby to a solids transfer line 30.

The transfer line 30 leads to a gas-solids separator 31. This unit is of conventional construction and usually is a cyclone type separator. Gas separated therein is removed as by gas discharge conduit 33 while separated solids are discharged therefrom as by a rotary valve or star wheel 32 into a solids discharge line 34. The solids discharge line 34 can lead directly to an extruder hopper 35.

The extruder hopper 35, which feeds an extruder 36, is conventional in construction and operation. It too is an enclosed structure adapted for establishing and maintaining a nitrogen atmosphere in its interior. The extruder 36 is of conventional construction, and is operated in normal fashion. The solids in the extruder hopper 35 move therefrom into the extruder which is operated at a rate of extrusion to result in the period of time between irradiation of the polyethylene and its entry into the extruder being sufficient for a significant amount of free-end long chain branches to form. Accordingly, the volume of the extruder hopper 35 is selected to provide, if necessary, the desired amount of hopper storage time to meet this condition. The extruder 36 is designed (length of extruder barrel and screw) and operated at a melt temperature and at a pressure sufficient to maintain the free radical containing polyethylene therein for the amount of time needed to deactivate substantially all of the free radicals present.

The thus treated, finely divided polyethylene is characterized by being substantially gel-free, having a density of from 0.89 to 0.97 g/cc, and being substantially branched with free-end long chains of ethylene units. It can be used as is, or introduced, for example, directly into a pelletizing and cooling unit 37 and conveyed away therefrom as by solids transport line 38 as solid pellets which can be stored and then used, or used without storage.

Similar results are achieved when other specific embodiments of high molecular weight, ethylene polymer material are treated according to the continuous process just depicted.

The following examples illustrate the high molecular weight, polyethylene of this invention, and the foregoing preferred embodiment of a process for making it.

The melt indexes, $I_2$ and $I_{10}$, are measured according to ASTM D-1238. The melt index ratio is determined by dividing $I_{10}$ by $I_2$. The ratio is indicative of the molecular weight distribution and the higher the number, the broader the molecular weight.

EXAMPLE 1

Soltex T50-200 polyethylene in pellet form having a MI of 2 and density of 0.95, is introduced into the enclosed radiation chamber 22 and purged with nitrogen until an oxygen level of 40 ppm is achieved.

The material is distributed on the moving stainless steel conveyer belt 21 to form a bed of polyethylene powder 1.3 cm high and 15 cm wide. The bed is passed by the conveyer belt 21 through an electron beam generated by a 2 MeV Van de Graff generator operating at a 50 microamp beam current. The resulting absorbed surface dosage is 0.40 Mrad. In addition, the active oxygen content of the environment or atmosphere within the enclosed radiation chamber 22 and in the remaining part of the system comprising the irradiated polyethylene transfer line 30, the solids-gas separator 31 and the separator discharge line 34 is established and maintained below 140 ppm.

After irradiation, the polyethylene falls off the end of the conveyer belt 21 into the belt discharge collector 28 and through the rotary valve 29 into the transfer line 30. After separation of gas from the irradiated polymer, the polymer is fed through the separator discharge line 34 into a bag purged with nitrogen.

The irradiated polyethylene is held for 30 minutes at room temperature in the absence of oxygen. The material is introduced into an extruder feed hopper that was purged with nitrogen and then extruded in a 2.5" single screw extruder at 260° C.

The properties of the gel-free end product of Example 1 are summarized in Table I.

EXAMPLES 2–4

Examples 2–4 are produced using the method and ingredients of Example 1 except that the resulting absorbed dosage was 0.6, 0.9, and 1.0 Mrad, respectively. The oxygen level is maintained below 60 ppm in the enclosed radiation chamber 22, the irradiated polyethylene transfer line 30, the solids gas separator 31 and the separator discharge line 34. The properties of the gel-free end products of Examples 2–4 are summarized in Table I.

EXAMPLES 5–8

Examples 5–8 are produced using the method and ingredients of Example 1 except that Dow 04052N polyethylene in pellet form having a MI of 4 and density of 0.952, and the resulting absorbed dosage was 0.5, 0.7, 0.8, and 1.0 Mrad, respectively. The oxygen level is maintained below ppm in the enclosed radiation chamber 22, the irradiated polyethylene transfer line 30, the solids gas separator 31 and the separator discharge line 34. The properties of the gel-free end products of Examples 5–8 are summarized in Table I set forth below.

CONTROL EXAMPLES 1 AND 2

Controls 1 and 2 are non-irradiated samples of Soltex T50-200 and Dow 04052N, respectively.

TABLE I

| Example | Dosage (Mrad) | $I_{10}$ | $I_2$ | $I_{10}/I_2$ |
|---------|---------------|----------|-------|--------------|
| C-1 | 0 | 4.1 | 1.8 | 2.27 |
| 1 | 0.4 | 10.9 | 1.0 | 10.4 |
| 2 | 0.6 | 10.0 | 0.89 | 11.2 |
| 3 | 0.9 | 8.7 | 0.67 | 13.0 |
| 4 | 1.0 | 7.9 | 0.64 | 12.5 |
| C-2 | 0 | 31.5 | 4.30 | 7.32 |
| 5 | 0.5 | 15.6 | 1.27 | 12.3 |
| 6 | 0.7 | 9.70 | 0.682 | 14.2 |
| 7 | 0.8 | 8.48 | 0.521 | 20.7 |
| 8 | 1.0 | 6.49 | 0.333 | 19.5 |

EXAMPLE 9 AND CONTROL EXAMPLES 3–8

To demonstrate the criticality of the irradiation atmosphere (IA), corresponding to the irradiation step (1) of the process, and radical intermediate aging (RIA) in a controlled environment having an oxygen content of less than 15%, corresponding to second step (2) of the process, and the radical intermediate deactivation step (RID), corresponding to the final step of the process of the invention, Example 9 and Control Examples 4–8 are produced using the method of Example 1 with the following exceptions:

—high density polyethylene having a MI of 6.90 in spherical particulate form from HIMONT Italia S.r.l. was used instead of Soltex T50-200;
—the resulting absorbed dosage is 1.1 Mrad;
—the processing environment for Controls 3–8 are varied as reported in Table II, and
—the radical deactivation is carried out on a ¾" Brabender Extruder at about 260° C.

The results are set forth below in Table II.

TABLE II

| Ex. | IA | RIA | RID | $I_2$ @ Day 1 | $I_2$ @ Day 3 | $I_2$ @ Day 13 |
|-----|-----|-----|-----|---------------|---------------|----------------|
| C-3 | — | — | — | 6.90 | — | — |
| C-4 | $N_2$ | Air | Air | 3.56 | 3.13 | 3.23 |
| C-5 | $N_2$ | — | — | 2.44 | 3.67 | 4.58 |
| C-6 | Air | Air | Air | 4.62 | 4.30 | 4.51 |

TABLE II-continued

| Ex. | IA | RIA | RID | $I_2$ @ Day 1 | $I_2$ @ Day 3 | $I_2$ @ Day 13 |
|---|---|---|---|---|---|---|
| C-7 | Air | $N_2$ | $N_2$ | 4.39 | 4.14 | 4.13 |
| C-8 | Air | — | — | 4.56 | 5.90 | 8.40 |
| 9 | $N_2$ | $N_2$ | $N_2$ | 2.86 | 2.63 | 2.60 |

Poor stability of the melt flow rate over 13 days was exhibited by Control Examples 5 and 8 as compared to Example 9 of the invention. Control Examples 4, 6 and 7 exhibited a somewhat better stability of the melt flow rate than Controls 5 and 8, but the melt flow rate is not as low as Example 9 of the invention.

EXAMPLES 10–15 AND CONTROL EXAMPLES 9 AND 10

Figure 2:
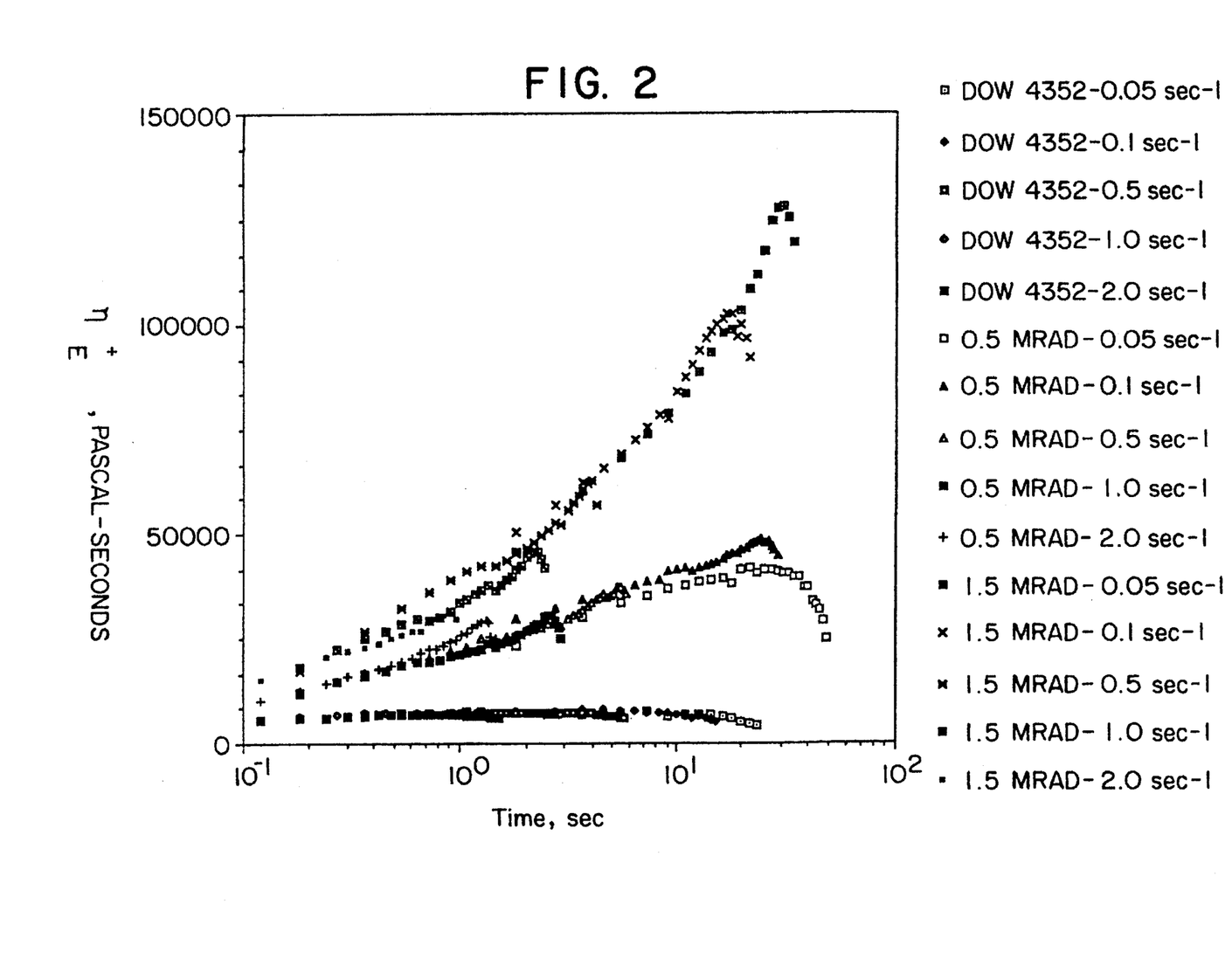
FIG. 2 are plots of elongational viscosities versus elongational times of samples of two, free-end long chain branched high density polyethylenes obtained by the process of this invention, and of a high density polyethylene control.
Figure 3:
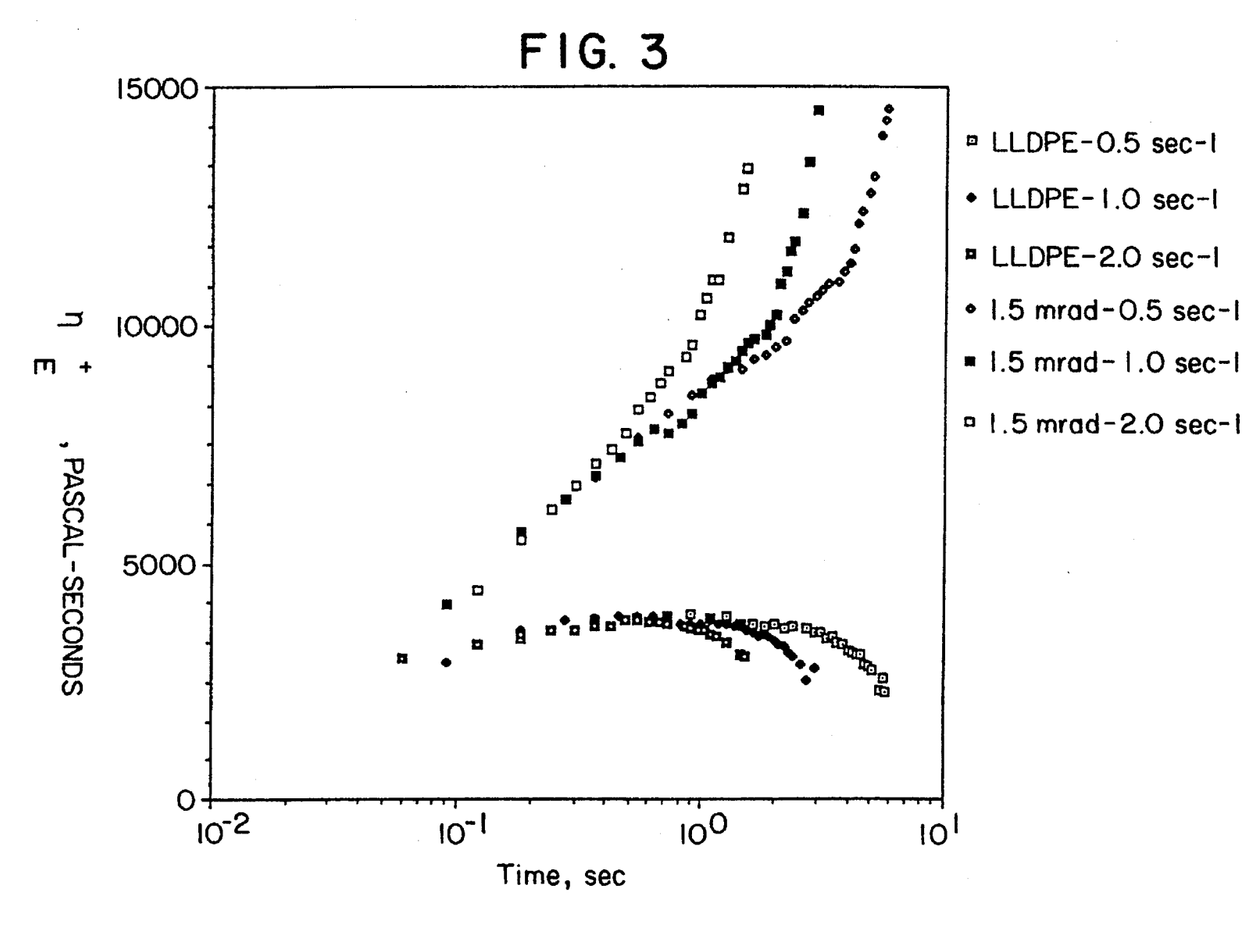
FIG. 3 are plots of elongational viscosities versus elongational times of a sample of a free-end long chain branched low density polyethylene obtained by the process of this invention, and of a sample of an LLDPE control.

Examples 10 to 15 are produced using the method of Example 1 except that the irradiated ethylene polymer is fed through the separator discharge line 34 into a nitrogen purged hopper of a ¾" Brabender extruder at 210° C. in first zone, 215° C. in the second zone, 220° C. at the die and then pelletized in a conventional manner. The pellets are then re-extruded with 0.1% Irganox 1010 stabilizer in a 1-¼" Killian single screw extruder with a Maddoch mixer at 100 rpm at a flat profile of 420° F. The hold time between irradiation and extrusion is an average of about 15 minutes. The properties of the end products of Examples 10 to 15 are summarized in Table III, and the elongational viscosities, measured using a Rheometrics RER 9000 extensional rheometer at 180° C. at strain rates between 0.05 to 2.0 sec$^{-1}$ of Examples 10, 12 and 14 and Control Examples 9 and 10 are illustrated in FIGS. 2 and 3.

The tendency towards strain hardening elongational viscosity increases as the branching index decreases, i.e., increases with increasing degree of long chain branching.

The free-end long chain branched ethylene polymer material of this invention has utility in melt processing operations to form useful articles, for example, foamed and thermoformed articles such as foamed and thermoformed sheet materials, extrusion coated articles and fibers. Indeed, the strain hardening ethylene polymer material of this invention is useful in all melt processing operations in which a high molecular weight, ethylene polymer material of enhanced melt strength is desired.

Other features, advantages and embodiments of the invention disclosed herein will be readily apparent to those exercising ordinary skill after reading the foregoing disclosures. In this regard, while specific embodiments of the invention had been described in considerable detail, variations and modifications of these embodiments can be effected without departing from the spirit and scope of the invention as described and claimed.

The expression "consisting essentially of" as used in this specification excludes an unrecited substance at a concentration sufficient to substantially adversely affect the essential properties and characteristics of the composition of the matter being defined, while permitting the presence of one or more unrecited substances at concentrations insufficient to substantially adversely affect said essential properties and characteristics.

We claim:

1. Normally solid, gel-free, polymer material selected from the group consisting of erradiated high density polyethylene, and irradiated random copolymers and terpolymers of ethylene and $C_{3-10}$ alpha olefins, the ethylene content of which copolymers and terpolymers is at least

TABLE III

| EX | POLYMER TYPE | DOSE (MRADS) | MELT TENSION[1] (Centi-newtons) | MELT EXTENSION[1] (cm) | $I_2$ at 190° C. | $I_{10}$ at 190° C. | $I_{10}/I_2$ | IV[2] | Mw[3] | B.I.[4] |
|---|---|---|---|---|---|---|---|---|---|---|
| C-9 | DOW 4352N[5] | 0 | 0.9 | 19.6 | 3.9 | 27.4 | 7.0 | 1.57 | 150000 | 1.0 |
| 10 | | 0.5 | 2.8 | 19.5 | 1.5 | 15.8 | 10.1 | 1.65 | 211000 | 0.83 |
| 11 | | 1.0 | 4.1 | 22.0 | 0.8 | 12.0 | 13.5 | 1.72 | 370000 | 0.57 |
| 12 | | 1.5 | 4.6 | 22.5 | 0.7 | 10.3 | 15.1 | 1.79 | 633000 | 0.40 |
| C-10 | LLDPE 1E10/A[6] | 0 | 0.4 | 20.1 | 7.9 | 58.4 | — | 1.3 | — | — |
| 13 | | 0.5 | 0.8 | 22.6 | — | 51.6 | — | 1.29 | — | — |
| 14 | | 1.5 | 1.5 | 21.1 | — | 39.7 | — | — | — | — |
| 15 | | 3.0 | — | — | — | 27 | — | 1.40 | — | — |

[1]Determined with a Gottfert Rheotens melt tension apparatus from Gottfert Inc. by measuring the tension of a strand of molten ethylene polymer in centi-newtons as follows: the polymer to be examined is extruded at 180° C. through a capillary 20 mm long and 2 mm in diameter; the strand is then subjected to stretching using a drawing system with a constant acceleration of 0.3 cm/ sec$^2$. The higher the tension, the better the viscoelasticity, and therefore the workability of the polymer in the molten state.
[2]Intrinsic viscosity measured in decalin at 135° C.
[3]Weight average molecular weight determined by laser light scattering with a Wyatt Dawn laser light scattering instrument from Wyatt Technology Corporation in trichlorobenzene at 135° C.
[4]Branching Index; $[IV]_{Lin} = 2.77 \times 10^{-4} Mw^{0.725}$.
[5]High density ethylene copolymer containing 0.5% propylene monomer units, in pellet form, having a melt index (MI) of 3.9, from Dow Chemical.
[6]LLDPE containing 6.1% butene-1 monomer units, admixed with 200 parts per million of Irganox 1076 stabilizer, in pellet form, having a MI of 7.9, from HIMONT Italia S.r.l.

The results set forth in the above table show that the ethylene polymers of this invention have increased melt index ratios indicating an increase in the molecular weight distribution, increased melt tension evidencing an increase in melt strength and branching indexes showing the formation of long chain branches.

The results set forth in FIGS. 2 and 3 show that the ethylene polymers of this invention have extensional viscosities indicative of the materials' strain hardening ability.

about 80% by weight, the weight average molecular weight of each member of the group being at least about 50,000, and each member of the group having been made by low pressure polymerization with a Ziegler-Natta catalyst system and having acquired by the following recited process enough free-end long chain branches to cause the branching index of said member to be less than about 0.9, and to cause said member to have significant strain hardening elongational viscosity, which process comprises:

(1) irradiating said ethylene polymer material while in the solid state.
  (a) in an environment in which the active oxygen concentration is established and maintained at less than about 15% by volume of said environment
  (b) with high energy ionizing radiation at a dose rate in the range from about 1 to about $10^4$ megarads per minute for a period of time sufficient to provide an exposure of up to 2.0 Mrads of radiation, but insufficient to cause gelation of the material;
(2) maintaining the thus irradiated material while in the solid state in such an environment for a period of time sufficient for a significant amount of free-end long chain branches to form; and
(3) then treating the irradiated material while in such environment to deactivate substantially all of the free radicals present in the irradiated material.

2. Polymer material according to claim 1 in which the branching index is about 0.2–0.8.

3. A film forming composition consisting essentially of polymer material according to claim 1.

4. Film consisting essentially of polymer material according to claim 1.

5. A useful article composed of an ethylene polymer composition comprising a substantial quantity of polymer material according to claim 1.

* * * * *